_United States Patent_ [19]

Kawashima et al.

[11] Patent Number: 4,954,140
[45] Date of Patent: Sep. 4, 1990

[54] ABRASIVES, ABRASIVE TOOLS, AND GRINDING METHOD

[75] Inventors: Norimichi Kawashima; Kazuya Orii, both of Tokyo, Japan

[73] Assignee: Tokyo Magnetic Printing Co., Ltd., Tokyo, Japan

[21] Appl. No.: 300,519

[22] Filed: Jan. 23, 1989

[30] Foreign Application Priority Data

Feb. 9, 1988 [JP] Japan ................................. 63-26607

[51] Int. Cl.$^5$ ................................................ B24B 1/00
[52] U.S. Cl. ........................................ 51/295; 51/293; 51/296
[58] Field of Search .......................... 51/293, 295, 296

[56] References Cited

U.S. PATENT DOCUMENTS

| | | | |
|---|---|---|---|
| 3,916,584 | 11/1975 | Howard et al. | 51/295 |
| 3,918,217 | 11/1975 | Oliver | 51/295 |
| 3,928,949 | 12/1975 | Wagner | 51/296 |
| 4,111,667 | 9/1978 | Adams | 51/295 |
| 4,132,533 | 1/1979 | Lohmer et al. | 51/296 |
| 4,350,497 | 9/1982 | Ogman | 51/296 |
| 4,543,106 | 9/1985 | Parekh | 51/296 |
| 4,799,939 | 1/1989 | Bloecher et al. | 51/295 |

Primary Examiner—Paul Lieberman
Assistant Examiner—Willie J. Thompson
Attorney, Agent, or Firm—Seidel, Gonda, Lavorgna & Monaco

[57] ABSTRACT

A composite spherical-particle abrasive comprises spherical particles and abrasive particles, each spherical particle being coated with a plurality of abrasive particles. The composite abrasive particles are dispersed in a binder resin, and the dispersion is applied as an abrasive layer or coat to a backing to provide an abrasive tool. A grinding method uses such a composite spherical-particle abrasive tool.

14 Claims, 2 Drawing Sheets

ABRASIVES, ABRASIVE TOOLS, AND GRINDING METHOD

BACKGROUND OF THE INVENTION

This invention relates to abrasive tools (abrasive films) suited for use in polishing, lapping, texturing, or other similar finish of precision machinery, devices, and parts, e.g., magnetic heads, hard disks, floppy heads, floppy disks, ceramic articles, plastic items, and jewels.

Abrasive films currently in use comprise a plastic film backing and an abrasive coat or layer of abrasive-dispersed coating material formed continuously or discontinuously over the backing. The abrasives employed include diamonds, alumina, silicon carbide, iron oxide, and chromium oxide.

High precision grinding requires an abrasive of fine grain size. Generally, the smaller the particle diameter of the abrasive the greater the difficulties involved in uniformly dispersing the abrasive in a resin because increased surface energy makes the particles easier to agglomerate. The grains, when applied in the agglomerated state, can scratch the workpiece or shorten the abrasive film life due to breaking down from the backing or other deficiency. The surface roughness of the coat decreases in proportion to the grain size, until the surface becomes nearly mirror smooth. This can increase the friction between the surface and the workpiece during grinding to such an extent that deposition or fusing of the binder resin occurs or the abrasive film life is shortened by loading owing to difficulties in removing the chips resulting from grinding.

SUMMARY OF THE INVENTION

It is an object of the present invention to provide abrasive particles, abrasive tools, and grinding method which involve rare grain agglomeration and no danger of damaging the workpiece.

Another object of the invention is to provide abrasive particles and abrasive tools which provide only limited friction between themselves and the workpiece and have reduced possibility of loading with grinding chips.

These objects of the invention are realized by the use of a composite spherical-particle abrasive made by coating spherical particles with abrasive particles. Briefly, the invention is characterized in that spherical particles larger in diameter than the abrasive particles to be used are coated, as nuclei, with the abrasive particles in a powdered form.

The composite spherical-particle abrasive thus formed is dispersible as coarse particles. It is therefore readily dispersed in a binder resin by simple agitation or other means.

The coat formed on the film backing has both undulations corresponding to the diameter of the spheres used and fine surface coarseness, with the voids serving as chip pockets.

Reduced friction during grinding improves the cutting performance of the abrasive particles, producing a better surface finish than heretofore.

The spherical particles effectively reinforce the coat and thereby increase its durability.

Thus the invention is characterized by the use of a composite spherical-particle abrasive comprising spherical particles coated with abrasive particles.

The basic technical concept of the invention will become apparent from the following description, taken in connection with the accompanying drawings.

DETAILED DESCRIPTION OF THE INVENTION

Figure 1:
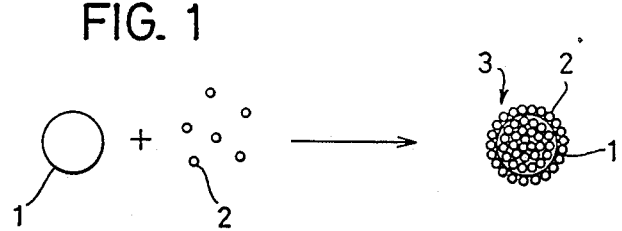
FIG. 1 diagrammatically shows a composite spherical abrasive particle and a process for producing the same in accordance with the present invention.

In FIG. 1 there is illustrated how fine abrasive particles 2 are deposited on a larger spherical polymer or inorganic particle that serves as a carrier, and also is shown the resulting composite spherical particle 3 of abrasive.

The composite spherical-particle abrasive 3 thus prepared is dispersed in a binder resin 4 by a dispersion mixer, and the dispersion is applied on a base film backing 5 to form an abrasive coat or layer 6. In this way an abrasive tool 7 of the invention is obtained.

Figure 2:
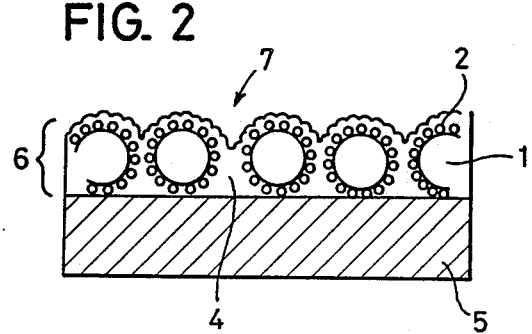
FIG. 2 is a cross sectional view of an abrasive tool of the invention using a composite spherical-particle abrasive.

FIG. 2 is a sectional view showing a part of the abrasive tool according to the invention. This tool is made by coating a backing 5 of plastic film with a continuous, single layer 6 of abrasive prepared by dispersing composite spherical-particle abrasive 3 in a binder resin 4.

Figure 3:
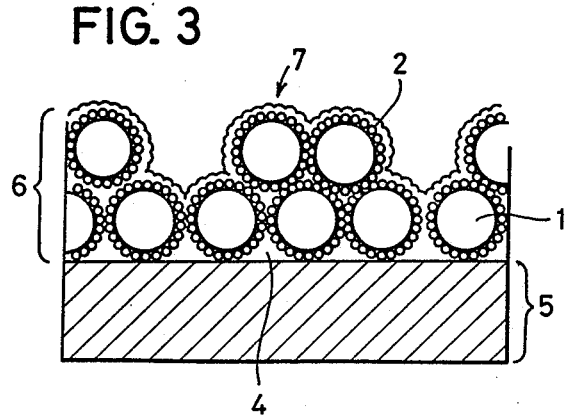
FIG. 3 is a cross sectional view of a composite spherical-particle abrasive in a coat of multilayer structure.

Another tool shown in FIG. 3 has a plurality of abrasive layers 6 as a coating on a backing 5 in such a manner that a discontinuous abrasive layer is formed as viewed from the side. It is also possible to provide an abrasive film having an adhesive layer and a release film on the reverse side of the backing 5 that, on the front, supports the abrasive layers 6.

Such abrasive films can be processed into desired forms for use, such as tapes or sheets.

The composite spherical-particle abrasive of the invention is made by mixing or otherwise contacting spherical particles of a relatively large diameter with abrasive particles of a relatively small diameter.

Polymer beads useful as spherical particles are, for example, those of fine nylon particles marketed by Toray Industries, Inc. under the trade designation "SP 500 series"; Seitetsu Kagaku Co.'s fine spherical particles "Flow beads," low-density polyethylenes, "LE1080" (average particle diameter=5.2 $\mu$m), "CL-2080" (average particle diameter). High-density polyethylene "HE5023" (average particle diameter=19 $\mu$m), and ethylene-acrylate copolymer "EA-209" (average particle diameter=13 $\mu$m); and Soken Kagaku's polystyrene gel powder (average particle diameter 17 $\mu$m). The polymer beads may instead consist of spherical inorganic particles as cores coated with one of the foregoing polymers.

Useful abrasive materials include diamonds, silicon carbide, alumina, chromium oxide, iron oxide, and cerium oxide. An abrasive with a particle size in the range of 0.01 to about 5 $\mu$m is desirable. The use of particles 2 $\mu$m or less in diameter proves particularly effective.

Binder resins which may be employed are thermosetting and thermoplastic ones. Among suitable thermosetting resins are polyester or acrylic polyol urethane resins, chlorinated polypropylene-modified acrylic polyol urethane resins, acrylic chelate-cured resins, epoxy or epoxy-pendant acrylic resin+amine-pendant acrylic resins, polyorganosiloxane resins, various ultraviolet-curing resins, urethane oil resins, moisture-curing polyurethane resins, fluororesins, and other similar resins which undergo curing reaction at or below 100° C. Melamine resins or the like may be used as well dependent on the backing and composite spherical-particle abrasive to be encountered.

Examples of usable thermoplastic resins are pure acrylic resins, vinyl chloride resins, nitrocellulose resins, nitrocellulose-acrylic resins, modified acrylic resins, alkyds, polyolefin resins, polyester resins, rubber resins such as urethane elastomers, nitrile rubbers, silicone rubbers, ethylene-vinyl acetate rubbers, and fluororubber resins, other water-soluble resins, and emulsion resins.

Usable base film backings include plastic films of polyethylene terephthalates, polyimides, and polycarbonates, with or without surface treatment.

The concentration of composite spherical particles, or composite spherical-particle abrasive, in the abrasive layer is desired to be in the range of 10 to 90%. The concentration that provides the highest durability is in the proximity of the critical volume concentration.

The composite spherical-particle abrasive can be easily produced by any of methods being used in the art. With regard to the preparation of composite spherical-particle abrasives, a number of studies from the mechanochemical standpoint on the mixture of two different powders have hitherto been reported.

Mixing two types of powders with different particle diameters involves a phenomenon in which fine particles of one powder deposit on and cover coarser particles of the other. This phenomenon is referred to in the literature, for example, as follows:

(1) Kawashima & Meguro: J. of the Jpn Soc of Colour Material, 46, 670 (1973).
(2) N. Kawashima & K. Meguro: Bull. Chem. Soc. Japan, 48, 1957 (1975).
(3) Kawashima & Meguro: J. of the Jpn Soc of Colour Material, 48, 670 (1975).

There are ordered mixtures in which again fine particles are deposited on larger particles but which exhibit superior uniformity. These mixtures are under study primarily in the field of pharmacy in quest of homogeneous mixtures of medicinal substances, excipients, and other ingredients. The literature on this subjects includes the following:

Honda et al.: J. Jpn Res. Inst. of Material Technology, 5, 403 (1987).

The ordered mixtures and the like described in the literature as using spherical polymer particles have already been used as additives to cosmetics, such as foundations, rinses, and body shampoos. The present invention is the first to adopt and embody the idea of utilizing such mixtures in abrasives.

The composite spherical-particle abrasive prepared in the manner described above is then mixed with a binder and a solvent. The mixture is applied to a film or other backing by suitable coating means. For example, a Mayer bar coater, gravure coater, reverse roll coater, or knife coater may be employed. The resulting coat is dried or cured to fix firmly to the backing, while the composite abrasive particles are bonded altogether.

The invention is illustrated by the following examples.

EXAMPLE 1

Nylon 12 ("SP-500" of Toray Industries, sp. gr. 1.02, av. ptc. dia. 5.0 $\mu$m) was used as spherical particles, and alumina (av. ptc. dia. 0.4 $\mu$m) as fine abrasive particles. The nylon 12/alumina mixing ratio was 33:67 by weight. The mixing ratio was such that the alumina particles could deposit as a substantially singular particle layer on each nylon 12 particle. The spherical particles (nylon 12) and abrasive particles (alumina) were mixed dry by a paint shaker until the individual spherical particle surfaces were completely coated with the abrasive particles.

The composite spherical-particle abrasive so obtained was used in preparing a coating material of the composition shown in the following table (all numerical values in parts by weight):

| | |
|---|---|
| Composite spherical abrasive particles | 100 |
| Binder resin ("VAGH") | 70 |
| Curing agent ("Coronate L") | 10 |
| Solvent (methyl ethyl ketone) | 120 |
| Total | 300 |

"VAGH" is the trademark for a vinyl chloride-vinyl acetate-vinyl alcohol copolymer marketed by Union Carbide Corp. "Coronate L" is a proprietary polyisocyanate. The coating solution thus prepared was applied by a gravure coater to a 75 $\mu$m-thick polyethylene terephthalate film to form coats varying in thickness from 5 to 20 $\mu$m. The coats were cured at 60° C. for 48 hours to give abrasive films.

Magnetic heads of ferrite were ground with varied abrasive tapes made in the foregoing way and with conventionally manufactured abrasive tapes. The percent scratch-defective of the tapes according to the invention was zero under conditions such that 0.2% flaws resulted from the use of conventional tapes. With the tapes of the invention, release of the coat from the backing was prevented.

EXAMPLES 2–5

In the same manner as described in Example 1, composite spherical-particle abrasives were prepared, except that the spherical particles used were the aforementioned low-density polyethylene "LE-1080" (av. ptc. dia. 5.2 $\mu$m) or nylon 12 ("SP-5000" of Toray, sp. gr. 1.02, av. ptc. dia. 5.0 $\mu$m), and the abrasive particles were "UA5055" (of Showa Denko K.K., av. ptc. dia. 0.4 $\mu$m) or "WA10.000" (of Fujimi Kenmazai, av. ptc. dia. 1 $\mu$m). Blending ratio of the two different particles, spherical and abrasive, was varied as in the tables given below.

Blends of the compositions formulated below were mixed in the same way as in Example 1 to prepare coating solutions. They were applied to backing films as in Example 1 and cured to afford abrasive tapes.

Composition of coating solution in Example 2:

| | |
|---|---|
| Composite spherical abrasive particles ("UA5055"/"LE1080" = 50/50) | 100 |
| Binder resin ("VAGH") | 40 |
| Curing agent ("Coronate L") | 5 |

-continued

| Solvent (methyl ethyl ketone) | 55 |
|---|---|
| Total | 200 |
| Composition of coating solution in Example 3: | |
| Composite spherical abrasive particles ("UA5055"/"LE1080" = 40/60) | 100 |
| Binder resin ("VAGH") | 40 |
| Curing agent ("Coronate L") | 5 |
| Solvent (methyl ethyl ketone) | 55 |
| Total | 200 |
| Composition of coating solution in Example 4: | |
| Composite spherical abrasive particles ("UA5055"/"SP-500" = 50/50) | 100 |
| Binder resin ("VAGH") | 40 |
| Curing agent ("Coronate L") | 5 |
| Solvent (methyl ethyl etone) | 55 |
| Total | 200 |

Figure 5:
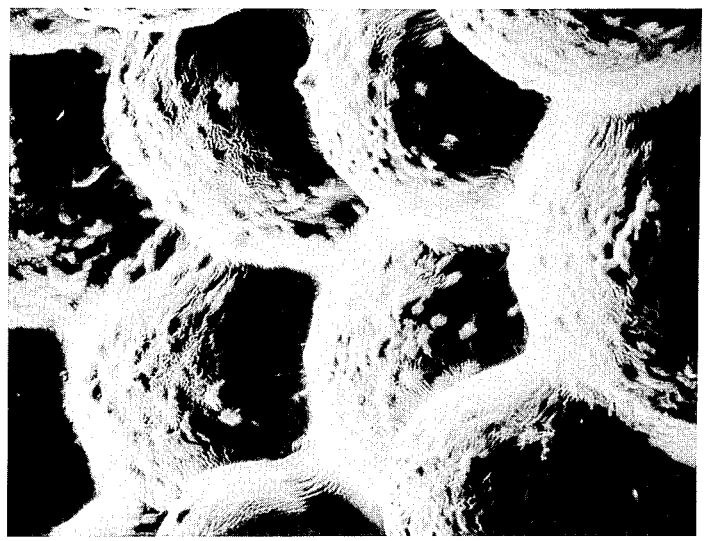
FIG. 5 is an electron micrograph showing the grain structure of a composite abrasive-particle coat.
Figure 4:
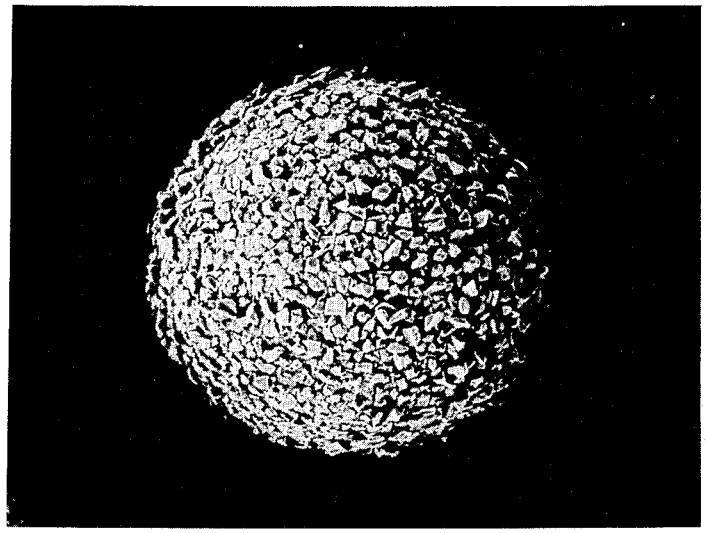
FIG. 4 is an electron micrograph showing the structure of a composite abrasive particle according to the invention.

For reference, an electron micrograph of a "UA5055"/"SP-500" composite abrasive particle is shown in FIG. 4 and an electron micrograph (6000×) of a coat comprising such composite particles in FIG. 5.

Composition of coating solution in Example 5:

| Composite spherical abrasive particles ("WA10.000"/"LE1080" = 50/50) | 100 |
|---|---|
| Binder resin ("VAGH") | 40 |
| Curing agent ("Coronate L") | 5 |
| Solvent (methyl ethyl ketone) | 55 |
| Total | 200 |

EXAMPLE 6

This example was intended to manufacture on a trial basis and experiment with an abrasive film in conformity with the invention. To that end, the composite abrasive particles described in Example 1 were dispersed in a thermoplastic binder resin, and an abrasive film was formed.

By the same method as in Example 1 a coating solution of the following composition was prepared to make an abrasive film:

| Composite spherical abrasive particles | 100 |
|---|---|
| Binder resin ("N2304")(solids content 40%) | 200 |
| Solvent (cyclohexanone) | 100 |
| Total | 400 |

The abrasive tape thus made and tapes conventionally made were used in texturing hard disks. It was confirmed by grinding tests that the tape produced no defect with scratch during grinding, whereas one or two grinding scratches resulted from the use of ordinary abrasive tapes under identical conditions.

This invention offers the following advantages:

(1) Since dry mixing causes fine abrasive particles to deposit uniformly on coarse spherical particles, the resulting composite spherical abrasive particles behave as giant particles in the situation where the fine abrasive particles are otherwise dispersed in a resin. Consequently, the composite particles disperse faster in a binder resin than do the fine particles alone. This reduces the dispersion cost, shortens the dispersion time, and prevents contamination with impurities. In addition, the modified particles prove effective in reinforcing the abrasive coat, thus adding to the coat strength, obviating release of the abrasive during grinding, and extending the tool life.

(2) The coat formed on a film backing exhibits undulations corresponding to the diameter of the modified particles and fine surface coarseness corresponding to the diameter of the modifying particles.

(3) Reduced friction with the workpiece during grinding improves the surface finish and precludes fusion of the binder resin with the heat of friction.

(4) Voids among composite spherical particles serve as sufficient chip pockets to avoid loading and prolong the abrasive life.

What is claimed is:

1. A composite spherical-particle abrasive comprising spherical particles of a solid polymer having an average diameter of less than about 20 μm and abrasive particles having an average diameter of 0.01 to about 5 μm but less than the average diameter of said spherical particles, each of said spherical particle being coated with said abrasive particles.

2. A flexible abrasive tool comprising a flexible backing film and an abrasive layer formed thereon, said abrasive layer being made of a dispersion in a binder resin of a composite spherical-particle abrasive comprising spherical particles of a solid polymer having an average diameter of less than about 20 μm and abrasive particles having an average diameter of 0.01 to about 5 μm but less than the average diameter of said spherical particles, each of said spherical particles being coated with said abrasive particles.

3. A grinding method which uses a composite spherical-particle abrasive comprising spherical particles of a solid polymer having an average diameter of less than about 20 μm and abrasive particles having an average diameter of 0.01 to about 5 μm but less than the average diameter of said spherical particles, each of said spherical particles being coated with said abrasive particles.

4. A flexible abrasive tool as recited in claim 2 wherein said backing film is a plastic film having a thickness which does not exceed about 75 μm and wherein said abrasive layer has a thickness of about 5 to about 20 μm.

5. A composite spherical-particle abrasive as recited in claim 1 wherein said abrasive particles have an average diameter of 0.01 to about 2 μm.

6. A composite spherical-particle abrasive as recited in claim 5 wherein said solid polymer has an average diameter of about 4.5 to about 5.5 μm.

7. A composite spherical-particle abrasive as recited in claim 6 wherein said abrasive particles have an average diameter of about 0.3 to about 0.5 μm.

8. A flexible abrasive tool as recited in claim 2 wherein said abrasive particles have an average diameter of 0.01 to about 2 μm.

9. A flexible abrasive tool as recited in claim 8 wherein said solid polymer has an average diameter of about 4.5 to about 5.5 μm.

10. A flexible abrasive tool as recited in claim 9 wherein said abrasive particles have an average diameter of about 0.3 to about 0.5 μm.

11. A flexible abrasive tool as recited in claim 10 wherein said backing film is a plastic film having a thickness which does not exceed about 75 μm and wherein said abrasive layer has a thickness of about 5 to about 20 μm.

12. A grinding method as recited in claim 3 wherein said abrasive particles have an average diameter of 0.01 to about 2 μm.

13. A grinding method as recited in claim 12 wherein said solid polymer has an average diameter of about 4.5 to about 5.5 μm.

14. A grinding method as recited in claim 13 wherein said abrasive particles have an average diameter of about 0.3 to about 0.5 μm.

* * * * *